United States Patent
Bucur et al.

(10) Patent No.: US 8,598,855 B2
(45) Date of Patent: Dec. 3, 2013

(54) MONITORING AND CONTROL CIRCUIT FOR ADJUSTING CURRENT

(75) Inventors: Constantin Bucur, Sunnyvale, CA (US); Jiun Heng Goh, Sunnyvale, CA (US); Flavius Lupy, San Jose, CA (US)

(73) Assignee: O2Micro, Inc., Santa Clara, CA (US)

( * ) Notice: Subject to any disclaimer, the term of this patent is extended or adjusted under 35 U.S.C. 154(b) by 255 days.

(21) Appl. No.: 12/316,690

(22) Filed: Dec. 15, 2008

(65) Prior Publication Data

US 2010/0327829 A1 Dec. 30, 2010

Related U.S. Application Data

(60) Provisional application No. 61/069,086, filed on Mar. 12, 2008.

(51) Int. Cl.
*G05F 1/56* (2006.01)
*G05F 1/569* (2006.01)
*G05F 1/567* (2006.01)

(52) U.S. Cl.
USPC ................. 323/282; 323/284; 363/56.09

(58) Field of Classification Search
USPC ........... 363/20, 21.01, 21.1, 21.11, 53, 56.03, 363/56.04, 56.05, 56.09, 56.1, 56.11, 80, 363/127; 323/273–284
See application file for complete search history.

(56) References Cited

U.S. PATENT DOCUMENTS

| | | | |
|---|---|---|---|
| 5,264,780 A * | 11/1993 | Bruer et al. | 323/222 |
| 5,375,029 A | 12/1994 | Fukunaga et al. | |
| 5,960,207 A * | 9/1999 | Brown | 713/300 |
| 6,337,563 B2 | 1/2002 | Takimoto et al. | |
| 6,385,060 B1 * | 5/2002 | Basso et al. | 363/21.15 |
| 6,788,038 B1 * | 9/2004 | Bell et al. | 323/284 |
| 6,806,694 B2 * | 10/2004 | Rupp et al. | 323/282 |
| 7,019,507 B1 * | 3/2006 | Dittmer et al. | 323/284 |
| 7,245,113 B2 * | 7/2007 | Chen et al. | 323/271 |
| 7,372,239 B2 * | 5/2008 | Kumagai et al. | 323/267 |

(Continued)

FOREIGN PATENT DOCUMENTS

| | | |
|---|---|---|
| EP | 0493238 A1 | 12/1991 |
| GB | 2265055 A | 9/1993 |
| JP | S61191288 A | 8/1986 |
| JP | 2000166227 A | 6/2000 |

OTHER PUBLICATIONS

Office Action issued in corresponding Japanese Patent Application No. 2009-55325 dated Jun. 25, 2013 (3 pages).

*Primary Examiner* — Adolf Berhane
*Assistant Examiner* — Nusrat Quddus

(57) ABSTRACT

A monitoring and control circuit comprises a sense block, a first and a second comparators, and a control module. The current sense block is coupled to a switch for generating a monitoring signal indicative of a current flowing through the switch. The first comparator coupled to the sense block is operable for comparing the monitoring signal to a first threshold and for providing a first signal according to a first comparison result between the monitoring signal and the first threshold. The second comparator coupled to the sense block is operable for comparing the monitoring signal to a second threshold and for providing a second signal according to a second comparison result between the monitoring signal and the second threshold. The control module coupled to the first comparator and the second comparator provides a control signal for controlling the switch according to the first signal and the second signal so as to adjust the current.

23 Claims, 4 Drawing Sheets

(56) References Cited

U.S. PATENT DOCUMENTS

| | | | |
|---|---|---|---|
| 7,453,250 B2 * | 11/2008 | Qiu et al. | 323/288 |
| 2001/0052759 A1 | 12/2001 | Sakurai et al. | |
| 2007/0013356 A1 * | 1/2007 | Qiu et al. | 323/288 |
| 2009/0027930 A1 * | 1/2009 | Usui | 363/84 |
| 2009/0190377 A1 * | 7/2009 | Wang et al. | 363/21.1 |

* cited by examiner

MONITORING AND CONTROL CIRCUIT FOR ADJUSTING CURRENT

CROSS REFERENCE TO RELATED APPLICATION

This application claims the benefit of U.S. provisional patent application, Ser. No. 61/069,086, entitled "over current protection circuit with pulse width modulation control," filed on Mar. 12, 2008, the specification of which is hereby incorporated in its entirety by this reference.

TECHNICAL FIELD

Embodiments in accordance with the present invention relate to electronic systems and protection systems.

BACKGROUND ART

The over current protection has been widely used in many systems such as battery charging systems so as to prevent damages to electronic components in the systems. A typical over-current protection method is to sense the charging/discharging current and to compare the sensed current with a threshold. When the charging/discharging current or the sensed current exceeds a predetermined level, a timer will be initiated for blanking the current for a predetermined period so as to reduce or limit the current. If the charging/discharging current still exceeds the predetermined level after the predetermined period, the charging/discharging circuit will be shut down. If the charging/discharging current decreases below the predetermined level within the predetermined period, a controller can resume the charging/discharging process.

However, the current level might not be effectively ensured to be within a safe level by the above mentioned conventional method, which may be an issue in power tools with a heavy duty load, e.g., a circular saw. When a heavy duty job is performed and a relatively large load current is drawn, a transient over current condition might occur. If the blanking period is not chosen adequately, the power tools may be stopped abruptly and get stuck into objects. Even if the blanking period can be chosen appropriately for one specific application, the system protection might be only suitable for this specific application since different power tools may have different load duties. Consequently, the compatibility of the system protection in various applications may not be adequate.

SUMMARY

According to one embodiment of the invention, a monitoring and control circuit comprises a sense block, a first and a second comparators, and a control module. The current sense block is coupled to a switch for generating a monitoring signal indicative of a current flowing through the switch. The first comparator coupled to the sense block is operable for comparing the monitoring signal to a first threshold and for providing a first signal according to a first comparison result between the monitoring signal and the first threshold. The second comparator coupled to the sense block is operable for comparing the monitoring signal to a second threshold and for providing a second signal according to a second comparison result between the monitoring signal and the second threshold. The control module coupled to the first comparator and the second comparator provides a control signal for controlling the switch according to the first signal and the second signal so as to adjust the current.

BRIEF DESCRIPTION OF THE DRAWINGS

Features and advantages of embodiments of the invention will become apparent as the following detailed description proceeds, and upon reference to the drawings, where like numerals depict like elements, and in which.

DETAILED DESCRIPTION

Figure 1:
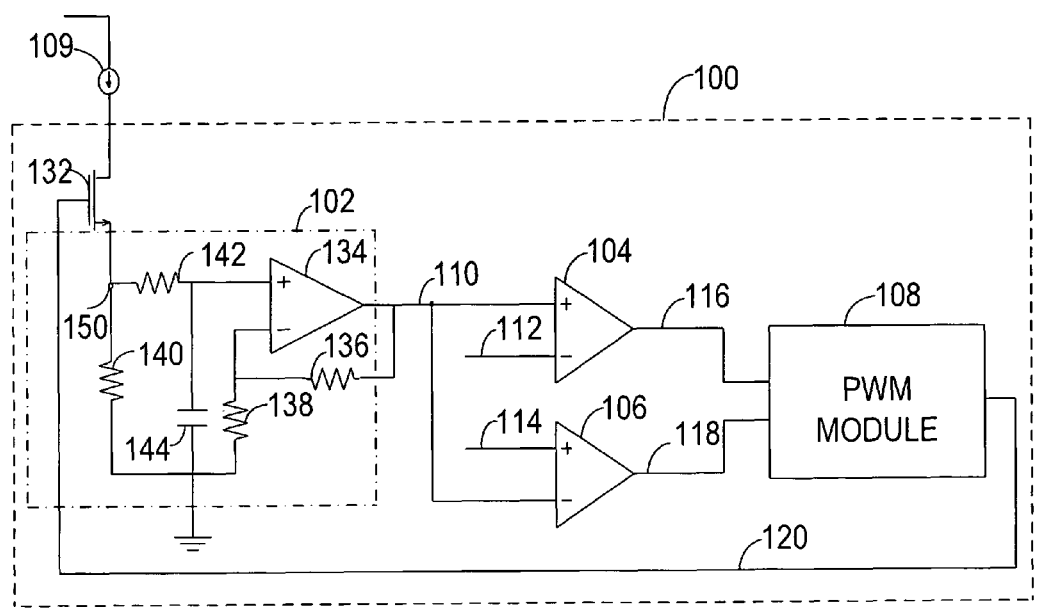
FIG. 1 is a diagram showing an exemplary protection circuit according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "receiving," "converting," "comparing," "generating," "amplifying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

In one embodiment, a protection circuit is provided for monitoring a current and controlling the current within a predetermined/desirable range. The protection circuit can include a control module for enabling and disabling a switch alternately so as to reduce the average current when the current exceeds a predetermined level, in one embodiment. The control module can generate a pulse modulation signal such as a pulse width modulation (PWM) signal to control the switch. Thus, the current can be adjusted by adjusting a duty cycle of the pulse modulation signal. In addition, the protection circuit can be suitable for various applications by properly setting the frequency of the control module, e.g., by setting the frequency of the PWM signal.

FIG. 1 shows an exemplary protection circuit 100 according to one embodiment of the present invention. The protection circuit 100 can be used to detect undesirable conditions such as over-current conditions and perform protection actions accordingly. The protection circuit 100 comprises a switch, e.g., a power Metal-Oxide-Semiconductor Field-Effect Transistor (MOSFET) 132, a sense block, e.g., a current sense/control block 102, a control module 108, and a mode selector which can include two comparators 104 and 106. The current sense/control block 102 can be used for generating a monitoring signal, such as an average voltage signal 110, indicative of a current 109 flowing through the power MOSFET 132. The control module 108 can generate a control signal, e.g., a PWM control signal 120 to control the power MOSFET 132. In one embodiment, the control module 108 can be a pulse width modulation module 108 for generating a PWM signal.

The current sense/control block 102 in the example of FIG. 1 comprises an operational amplifier 134, a capacitance 144, three resistors 142, 136 and 138, and a sense resistor 140. However, the current sense/control block 102 can have many other configurations and is not limited to the exemplary configuration in FIG. 1. The sense resistor 140 is used for converting the current 109 to a sensed voltage 150. The capacitance 144 and the resistor 142 can serve as a low pass filter to provide an average voltage according to the sensed voltage 150. The operational amplifier 134 with combination of resistors 136 and 138 can be used for amplifying the average voltage to an average voltage signal 110 which can be compared with a first threshold and a second threshold, such as a first threshold voltage 112 and a second threshold voltage 114. In one embodiment, the first threshold voltage 112 is greater than the second threshold voltage 114. By varying the ratios of resistors 136 and 138, the gain of the operational amplifier 134 can be varied.

The power MOSFET 132 includes a parasitic resistor, in one embodiment. Instead of using the sense resistor 140, the parasitic resistor can be used for converting the current 109 to the sensed voltage 150. In other words, the sense resistor 140 can be omitted, in one embodiment.

The power MOSFET 132 can be other semiconductor components as long as it served as a switch which can be controlled by the PWM control signal 120 to switch on and off. Alternately, the control module 108 can generate an analog signal to control the switch 132 linearly.

The average voltage signal 110 is inputted to the comparators 104 and 106. The first threshold voltage 112 and the second threshold voltage 114 are also inputted to the comparators 104 and 106, respectively. A mode signal can be a first signal 116 generated by the comparator 104 or can be a second signal 118 generated by the comparator 106. The mode signal can be used for determining whether a predetermined condition, e.g., an over current condition occurs. If the predetermined condition occurs, the protection circuit 100 can be switched to a protection mode. Otherwise, the protection circuit 100 can work in a normal mode.

In one embodiment, the first threshold voltage 112 can be used for determining whether the predetermined condition occurs based on whether the current 109 is greater than a threshold current I1. The threshold current I1 can be calculated in equation (1) shown as follows:

$$I1 = V\_oc1/(Rsense*Ag), \tag{1}$$

where $V\_oc1$ is the first threshold voltage 112, Rsense is the resistance of a sense resistor and Ag is the gain of the operational amplifier 134. The sense resistor can be the parasitic resister of the power MOSFET 132 or an independent sense resistor, e.g., sense resistor 140, in the current sense/control block 102.

During operation, when the average voltage signal 110 is less than the first threshold voltage 112, which can indicate that the current 109 is less than $I_1$, the control module 108 works in a normal mode or is disabled, in one embodiment. In the normal mode, the power MOSFET 132 is on. When the average voltage signal 110 is greater than the first threshold voltage 112, which can indicate that the current 109 is greater than $I_1$, the comparator 104 can output the first signal 116 to switch the protection circuit 100 to the protection mode, in one embodiment. During the protection mode, the control module 108 outputs the PWM control signal 120 to control the power MOSFET 132. The PWM control signal 120 can include a plurality of pulses having an adjustable duty cycle and adjustable frequency for switching the power MOSFET 132 on and off alternately, in one embodiment. With this feature, the current 109 will not be completely cut off, but can be reduced, in one embodiment. As such, the load power can be reduced. Besides, the over current conditions in transient period can be avoided, in one embodiment. The average level $I_0$ of the current 109 in this protection mode can be approximately calculated as the current 109 times the duty cycle of the PWM control signal 120.

In one embodiment, the second threshold voltage 114 represents a safe level which can be used to control the current 109 below a threshold current $I_2$ indicative of a safe current. In one embodiment, the threshold current $I_2$ is less than the threshold current $I_1$. The threshold current $I_2$ can be calculated in equation (2) shown as follows:

$$I2 = V\_oc2/(Rsense*Ag), \quad (2)$$

where V_oc2 is the second threshold voltage 114, Rsense is the resistance of the sense resistor and Ag is the gain of the operational amplifier 134. When the average voltage signal 110 is less than the second threshold voltage 114, which can indicate that the average current $I_0$ drops below the threshold current $I_2$, the comparator 106 can output the second signal 118 to switch the protection circuit 100 back to the normal mode in which the power MOSFET 132 is on, in one embodiment.

Advantageously, since the ratio of threshold voltages 112 and 114 can be adjusted as well as the duty cycle of the PWM control signal 120, the flexibility of the protection circuit 100 can be enhanced. The protection circuit 100 can be used in various applications, and the threshold voltages 112 and 114, the duty cycle of the PWM control signal 120 can be adjusted according to different application needs.

Figure 2:
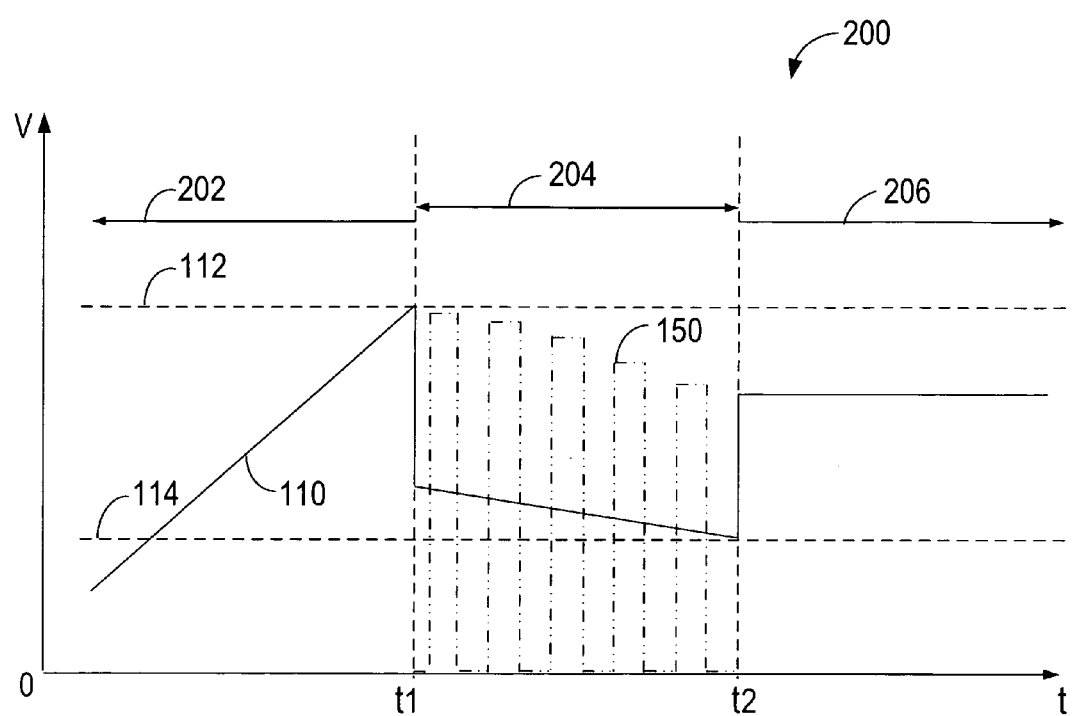
FIG. 2 is a diagram showing exemplary waveforms of the protection circuit of FIG. 1, in accordance with one embodiment of the present invention.

FIG. 2 shows exemplary waveforms 200 of the protection circuit 100 according to one embodiment of the present invention. FIG. 2 is described herein with reference to the protection circuit 100 in FIG. 1. The x-axis represents the time and the y-axis represents the voltage. Two types of modes are illustrated: a protection mode 204 and two normal modes 202 and 206. The exemplary duty cycle of the PWM signal 120 in FIG. 1 is 50%, in the example of FIG. 2. Thus, the power MOSFET 132 shown in FIG. 1 is turned on in 50% of the time and turned off in the other 50% of the time during the protection mode 204.

As shown in FIG. 2, at the beginning, the protection circuit 100 shown in FIG. 1 works in the normal mode 202. An average voltage signal 110 may increase due to the increase of the current 109. When the average voltage signal 110 exceeds the first threshold voltage 112 at time t1, or in other words, when the current 109 shown in FIG. 1 exceeds the threshold current $I_1$, the protection circuit 100 in FIG. 1 can be automatically switch to the protection mode 204.

In the protection mode 204, the control module 108 in FIG. 1 can output the PWM control signal 120 having the exemplary duty cycle of 50% for driving the power MOSFET 132. As such, the power MOSFET 132 shown in FIG. 1 can be turned on and turned off alternately, in one embodiment. The current 109 shown in FIG. 1 can be reduced from the threshold current $I_1$ to ($I_1/2$) at the time t1, in the example of FIG. 2. The curve 150 in dash dotted line shows an example of the sensed voltage 150 in FIG. 1 in the protection mode 204. The frequency of the sensed voltage 150 corresponds to the on/off frequency of the power MOSFET 132, in one embodiment.

The protection mode 204 is continued until the average voltage signal 110 drops below the second threshold voltage 114 at time t2, or in other words, the average current of the current 109 shown in FIG. 1 drops below the threshold current $I_2$. Once the average voltage 110 drops below the second threshold voltage 114 at time t2, the protection circuit 100 shown in FIG. 1 switches back to the normal mode 206, in one embodiment.

At the moment when the protection circuit 100 in FIG. 1 just switches back to the normal mode 206, the current 109 can be $2I_2$ which is also below the threshold current $I_1$, in one embodiment. As shown in FIG. 2, the value of the average voltage signal 110 at time t2 is doubled since the exemplary duty cycle is 50%.

The average voltage signal 110 in FIG. 2 is for illustrative purposes. In the practical operation, the average voltage signal 110 can be continuous and can vary with time.

Figure 3:
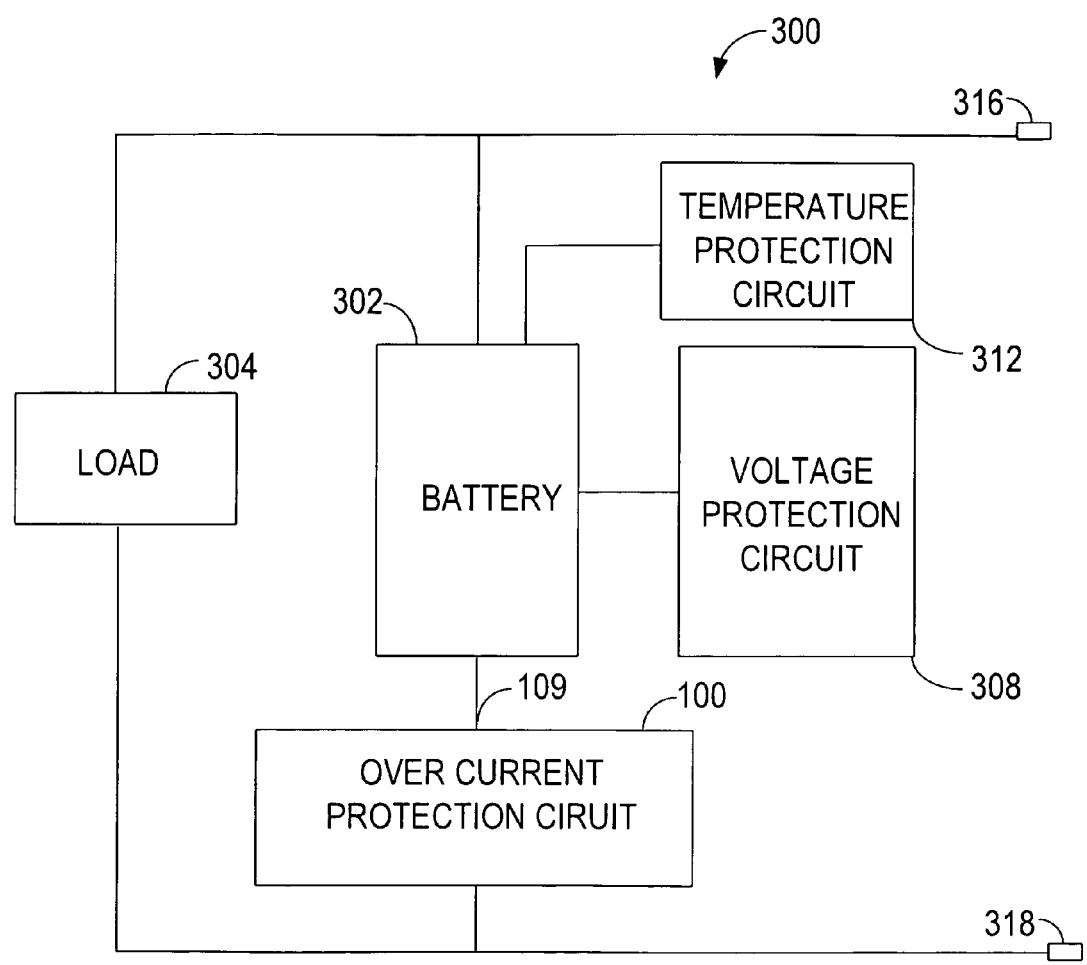
FIG. 3 shows a battery management system including a protection circuit, in accordance with one embodiment of the present invention.

FIG. 3 shows an exemplary application of the protection circuit 100 in a battery protection system 300, according to one embodiment of the present invention. A battery 302 including two charger pads 316 and 318 is coupled to a load 304 in series for supplying power to the load 304. The battery 302 can include one or more battery cells. The protection circuit 100 can be used for monitoring and controlling the current 109 such that the current 109 does not exceed a predetermined level, e.g., the first threshold voltage 112 in FIG. 1.

In one embodiment, when a charger (not shown) is coupled to the charger pads 316 and 318 for charging the battery 302, the protection circuit 100 can be used for monitoring the charging current. In another embodiment, when the battery 302 supplies power to the load 304, the protection circuit 100 can be used for monitoring the discharging current.

The battery protection system 300 can also include a voltage protection circuit 308 for monitoring the battery 302 to avoid over/under voltage situations. In one embodiment, the voltage protection circuit 308 sends out voltage alert signals when the voltage of the battery 302 is over/under predetermined levels.

The battery protection system 300 can also include a temperature protection circuit 312 for monitoring the temperature of the battery 302. In one embodiment, the temperature protection circuit 312 sends out temperature alert signals when the temperature of the battery 302 is over/under predetermined levels.

Figure 4:
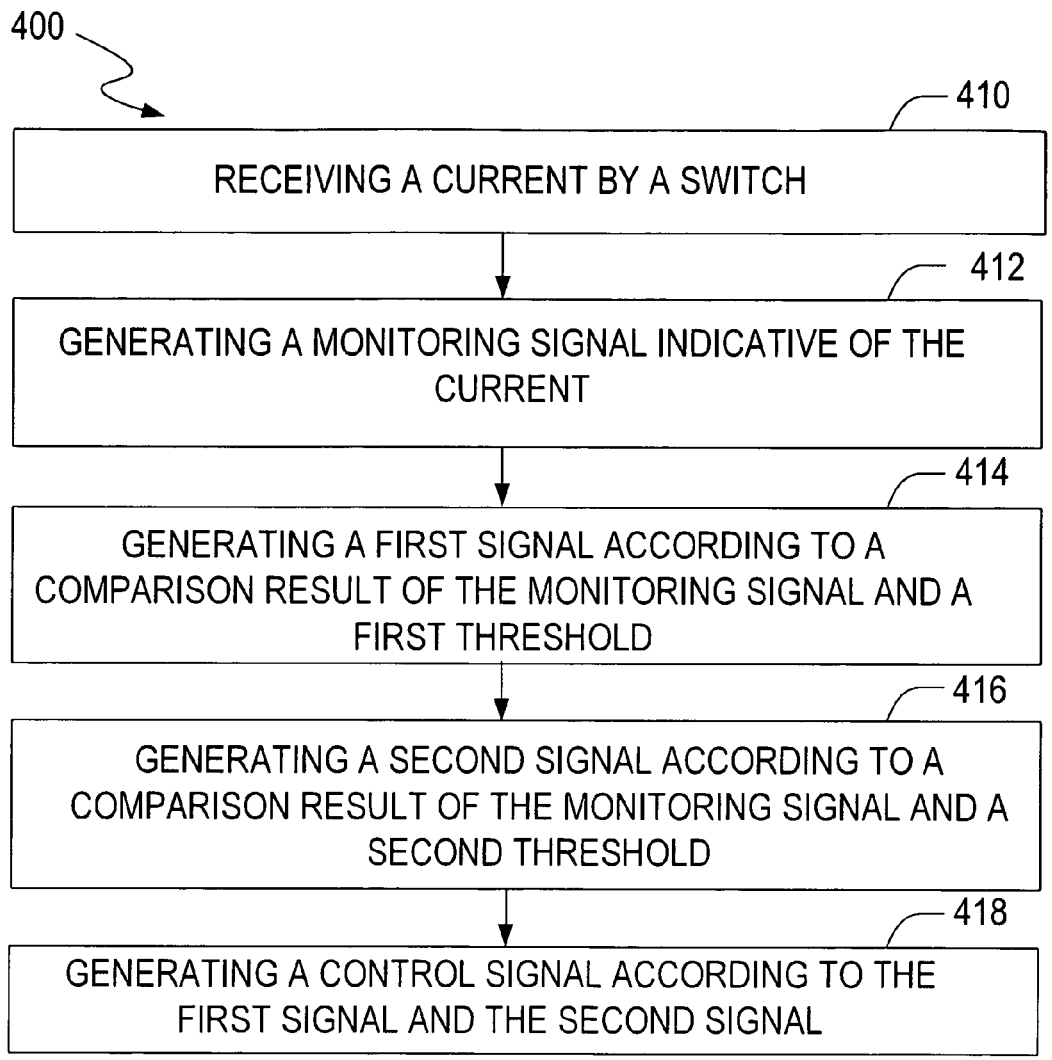
FIG. 4 is a flowchart showing a method for adjusting a current, in accordance with one embodiment of the present invention.

FIG. 4 shows a method 400 for adjusting a current in accordance with one embodiment of the present invention. FIG. 4 is described in combination with FIG. 1.

At 410, a current 109 is received by a switch, such as a power MOSFET 132.

At 412, a monitoring signal, such as an average voltage signal 110 which can be used for indicating a level of the current 109, is generated. In one embodiment, the current 109 flowing through the power MOSFET 132 is converted to the average voltage signal 110 by the current sense/control block 102. A sense resistor which can be the parasitic resister of the power MOSFET 132 or an independent sense resistor 140 can convert the current 109 to a sensed voltage 150. The capacitor 144 and the resistor 142 can be served as a low pass filter to provide an average voltage according to the sensed voltage 150. The average voltage can be amplified by an operational amplifier 134 combined with resistors 136 and 138 to the average voltage signal 110. By varying the ratios of resistors 136 and 138, the gain of the operational amplifier 134 can be varied.

At 414, a first signal 116 is generated according to a comparison result of the monitoring signal and a first threshold voltage 112. In one embodiment, the average voltage signal 110 is compared with the first threshold voltage 112 by a comparator 104. The comparator 104 can output the first signal 116 when the average voltage signal 110 is greater than the first threshold voltage 112. The first threshold voltage 112 can be used for determining whether a predetermined condition occurs based on whether the current 109 is greater than a threshold current $I_1$. For example, when the average voltage signal 110 is greater than the first threshold voltage 112, the comparator 104 can output the first signal 116.

At 416, a second signal 118 is generated according to a comparison result of the monitoring signal and a second threshold voltage 112. In one embodiment, a comparator 106 can output the second signal 118 when the average voltage signal 110 is less than the second threshold voltage 114. The second threshold voltage 114 represents a safe level which can be used to ensure that the current 109 is below a threshold current $I_2$. In other words, when the average voltage signal 110 is less than the second threshold voltage 114, the comparator 106 can output the second signal 118.

At 418, a control signal 120 according to the first signal 116 and the second signal 118 is generated by the control module 108. The control signal 120 can be used for controlling the power MOSFET 132 so as to adjust the current 109. In a protection mode, the power MOSFET 132 is enabled and disabled alternately to reduce the average current of the current 109, in one embodiment.

Accordingly, the protection circuit according to one embodiment of the present invention can be used for monitoring and controlling current within a predetermined range by working in a protection mode when the current exceeds the predetermined range. In one embodiment, a switch in the protection circuit is enabled and disabled alternately, thus the current can be reduced but not completely cut off. Advantageously, the protection circuit can be suitable for various applications by properly configuring the control module.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A monitoring and control circuit, comprising:
    a terminal operable for providing a monitoring signal indicative of a current flowing through a switch;
    comparator circuitry coupled to said terminal and operable for comparing said monitoring signal to a first threshold to provide a first signal according to the comparison between said monitoring signal and said first threshold, and operable for comparing said monitoring signal to a second threshold to provide a second signal according to the comparison between said monitoring signal and said second threshold; and
    a control module coupled to said switch and said comparator circuitry and operable for providing a control signal to control said switch to operate in a normal mode or a protection mode according to said first signal and said second signal so as to adjust said current, wherein in said protection mode, said control signal turns on and off said switch alternately to reduce said monitoring signal from said first threshold to said second threshold.

2. The monitoring and control circuit of claim 1, wherein said comparator circuitry comprises a comparator that provides said first signal if said monitoring signal is greater than said first threshold.

3. The monitoring and control circuit of claim 1, wherein said comparator circuitry comprises a comparator that provides said second signal if said monitoring signal is less than said second threshold.

4. The monitoring and control circuit of claim 1, wherein said monitoring signal comprises a voltage signal indicative of an average level of said current.

5. The monitoring and control circuit of claim 4, further comprising:
    a sense resistor coupled to said switch and operable for converting said current to a sensed voltage;
    a low pass filter coupled to said sense resistor and operable for providing an average voltage according to said sensed voltage; and
    an operational amplifier coupled to said low pass filter and operable for amplifying said average voltage to said voltage signal.

6. The monitoring and control circuit of claim 1, wherein said switch comprises a parasitic resistor operable for converting said current to a sensed voltage.

7. The monitoring and control circuit of claim 1, wherein said control signal comprises a pulse width modulation (PWM) signal to turn on and off said switch alternately.

8. A protection circuit comprising:
    a terminal operable for providing a monitoring signal indicative of a current flowing through a switch;
    a mode selector coupled to said terminal and operable for selecting a mode from at least a normal mode and a protection mode by comparing said monitoring signal with a first threshold and a second threshold, and operable for generating a mode signal; and
    a control module coupled to said mode selector and operable for providing a control signal to control said switch according to said mode signal, wherein in said protection mode, said control signal turns on and off said switch alternately to reduce said monitoring signal from said first threshold to said second threshold.

9. The protection circuit of claim 8, wherein said mode selector comprises:
    a first comparator operable for comparing said monitoring signal to said first threshold and operable for providing a first signal according to a first comparison result between said monitoring signal and said first threshold; and
    a second comparator operable for comparing said monitoring signal to said second threshold and operable for providing a second signal according to a second comparison result between said monitoring signal and said second threshold.

10. The protection circuit of claim 9, wherein said mode signal comprises at least one of said first and said second signal.

11. The protection circuit of claim 8, wherein said control signal comprises a PWM signal to turn on and off said switch alternately.

12. A method for adjusting a current, comprising:
    controlling said current to flow through a switch;
    generating a monitoring signal indicative of said current;

generating a control signal according to comparison between said monitoring signal and a first threshold and according to comparison between said monitoring signal and a second threshold;

controlling said switch to operate in a normal mode or a protection mode, using said control signal, so as to adjust said current; and in said protection mode, alternately turning on and off said switch to reduce said monitoring signal from said first threshold to said second threshold.

13. The method of claim 12, wherein said control signal comprises a pulse width modulation (PWM) signal to turn on and off said switch alternately.

14. The monitoring and control circuit of claim 1, wherein said control module alternately enables and disables said switch to reduce said current if a level of said current is greater than a first current threshold.

15. The monitoring and control circuit of claim 1, wherein said control module enables said switch if a level of said current decreases to a second current threshold.

16. The protection circuit of claim 8, wherein said mode selector selects said protection mode if said monitoring signal is greater than said first threshold.

17. The protection circuit of claim 8, wherein said mode selector selects said normal mode if said monitoring signal is less than said second threshold.

18. The monitoring and control circuit of claim 1, wherein in said normal mode, said control signal maintains said switch on.

19. The monitoring and control circuit of claim 7, wherein said second threshold divided by a duty cycle of said PWM signal is less than said first threshold.

20. The protection circuit of claim 8, wherein in said normal mode, said control signal maintains said switch on.

21. The protection circuit of claim 11, wherein said second threshold divided by a duty cycle of said PWM signal is less than said first threshold.

22. The method of claim 12, further comprising:

maintaining said switch on in said normal mode.

23. The method of claim 13, wherein said second threshold divided by a duty cycle of said PWM signal is less than said first threshold.

* * * * *